(12) United States Patent
Yamamoto et al.

(10) Patent No.: US 6,646,980 B1
(45) Date of Patent: Nov. 11, 2003

(54) OFDM DEMODULATOR

(75) Inventors: Takeshi Yamamoto, Tokyo (JP);
Kazuhiro Okanoue, Tokyo (JP);
Tomoki Osawa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/537,417

(22) Filed: Mar. 29, 2000

(30) Foreign Application Priority Data

Mar. 30, 1999 (JP) .......................................... 11-089475

(51) Int. Cl.[7] ............................................... H04J 11/00
(52) U.S. Cl. ...................... 370/208; 370/210; 370/343; 370/350; 375/260; 375/344; 375/355
(58) Field of Search ................................. 370/208, 209, 370/210, 343, 350; 375/260, 316, 355, 344, 354

(56) References Cited

U.S. PATENT DOCUMENTS

| 5,717,722 A | | 2/1998 | Mori ........................... 375/326 |
| 6,052,418 A | * | 4/2000 | Watanabe et al. ............ 375/344 |
| 6,198,781 B1 | * | 3/2001 | Ohno et al. .................. 375/322 |
| 6,266,377 B1 | * | 7/2001 | Velez et al. .................. 375/261 |

FOREIGN PATENT DOCUMENTS

| WO | WO 96/19056 | 6/1996 |
| WO | WO 98/07269 A1 | 2/1998 |

OTHER PUBLICATIONS

DRAFT Supplement to STANDARD [for] Information Technology—Telecommunications and information Exchange between systems—Local and metropolitan area networks—Specific Requirements, "Part 11: Wireless LAN Medium Access Control (MAC) and Physical Layer (PHY) specifications: High Speed Physical Layer in the 5 GHz Band", IEEE P802.11a/D7.0, Jul. 1999.

* cited by examiner

Primary Examiner—Dang Ton
Assistant Examiner—Inder Pal Mehra
(74) Attorney, Agent, or Firm—Sughrue Mion, PLLC

(57) ABSTRACT

In an OFDM demodulator, in order to stably perform a timing reproducing process with a simple configuration, a complex correlation circuit correlates sampled and quantized digital complex baseband signals outputted from A/D converters and a pattern of a preamble for timing/carrier frequency synchronization of a short symbol prestored in a reference signal storing circuit and outputs the correlation result. The correlation result is supplied to a timing detecting circuit and the timing of the short symbol is detected.

2 Claims, 6 Drawing Sheets

OFDM DEMODULATOR

BACKGROUND OF THE INVENTION

The present invention relates to a demodulator of a burst communication system using an OFDM (Orthogonal Frequency Division Multiplexing) modulating method and, more particularly, to an OFDM demodulator using a simple timing reproducing circuit.

An OFDM modulating method has been being examined as a modulating method of multimedia communication such as a high-speed wireless LAN. In a high-speed wireless LAN having information transmission speed of tens Mbits/sec, when a conventional modulating method of performing modulation such as QPSK on a single carrier wave, large waveform distortion occurs over a plurality of symbols by a multipath delay wave. On the other hand, in the OFDM modulating method, multicarrier modulation in which an information signal is divided into a plurality of subcarriers is performed, and the waveform distortion caused by the multipath delay wave is reduced by insertion/deletion of a guard interval (GI). Consequently, the method is adapted to a high-speed wireless transmission system.

In a wireless LAN, generally, a signal is transmitted/received in a packet. At the head of a packet used for synchronization of the packet, a preamble for frequency synchronization and symbol timing synchronization is provided.

FIG. 6 is a diagram showing a format of an OFDM burst signal compliant with IEEE802.11 in which the international standard of a wireless LAN is specified. In the diagram, at the head of burst data 23, a preamble 24 for OFDM frequency synchronization and symbol timing synchronization and a preamble 25 for estimating a channel characteristics path are provided.

The frequency synchronization is performed to correct a frequency error of an oscillator of a transmitter/receiver. It is important since the OFDM signal deteriorates by a frequency error more than a conventional modulation signal. The symbol timing synchronization is established for a process of demodulating an OFDM burst signal.

The shorter the preamble 24 for timing/carrier frequency synchronization is, the more it is desirable from the viewpoint of transfer efficiency. Consequently, a plurality of symbols each of which is shorter than the length of the OFDM symbol (generally, about 4 μsec) are arranged. After that, the preamble 25 for estimating the channel characteristic of the OFDM symbol length is disposed.

In FIG. 6, five short symbols are provided as an example. The number of short symbols is properly selected according to the synchronization condition. As the time of the short symbol, time shorter than the time of the OFDM symbol, for example, about ½ or ¼ of the time of the OFDM symbol is generally set.

In the case of using such a short symbol, although there is an advantage such that the process delay time is short, since the symbol cycle is short, an average sample number cannot be obtained in a symbol reproducing circuit and there is a problem such that timing detection accuracy cannot be obtained.

There is also a problem such that since the short symbol is used, a method of detecting a timing of switching the short symbol to a normal OFDM symbol is complicated.

SUMMARY OF THE INVENTION

It is an object of the invention to provide an OFDM demodulator using a symbol reproducing circuit capable of easily detecting a preamble for timing/carrier frequency synchronization using short symbols with high detection accuracy.

In order to achieve the object, according to the invention, there is provided an OFDM demodulator for demodulating an orthogonal frequency division multiplexing (OFDM) modulated burst signal, comprising:

a quasi-synchronous detector for converting the OFDM modulated bust signal into two complex baseband signals by quasi-synchronous detection;

a carrier frequency estimating circuit for receiving the complex baseband signals, estimating a carrier frequency, and compensating a carrier frequency error;

a symbol timing estimating circuit for controlling the width of a detection window on the basis of a result of correlation between a preamble signal in the complex baseband signal and a prestored pattern signal and reproducing a timing of the burst signal;

a symbol synchronization processing circuit for establishing symbol synchronization on the basis of an output of the symbol timing estimating means with respect to the complex baseband signal in which the carrier frequency error has been compensated;

an FFT for performing Fourier transform on an output of the symbol synchronization processing circuit to thereby divide the output into signals of respective subcarriers; and a subcarrier demodulator for demodulating an output of the FFT every subcarrier.

BRIEF DESCRIPTION OF THE DRAWINGS

The above and other objects, features and advantages of the present invention will become more apparent from the following detailed description when taken in conjunction with the accompanying drawings wherein.

DESCRIPTION OF THE PREFERRED EMBODIMENT

An embodiment of the invention will be described by using the drawings.

Figure 1:
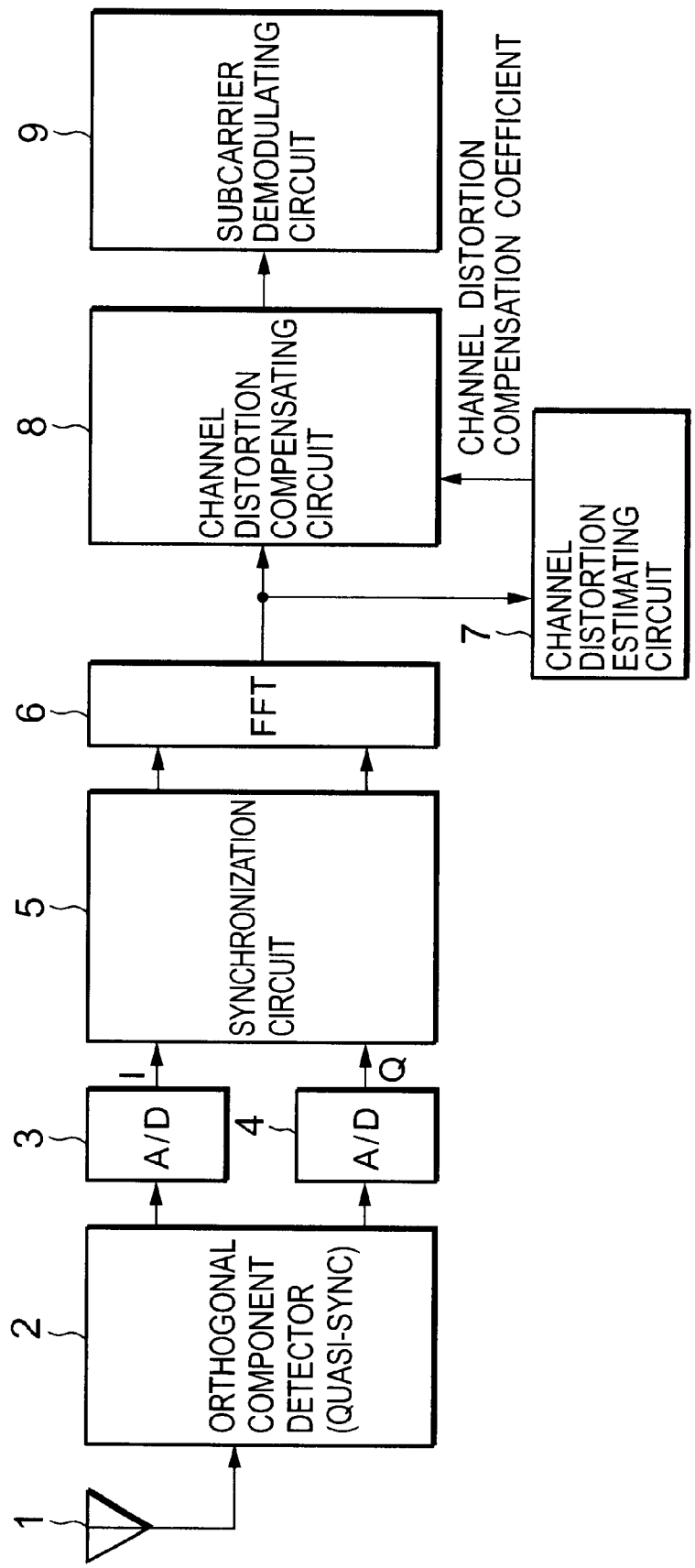
FIG. 1 is a block diagram of an OFDM demodulator of the invention.
Figure 6:
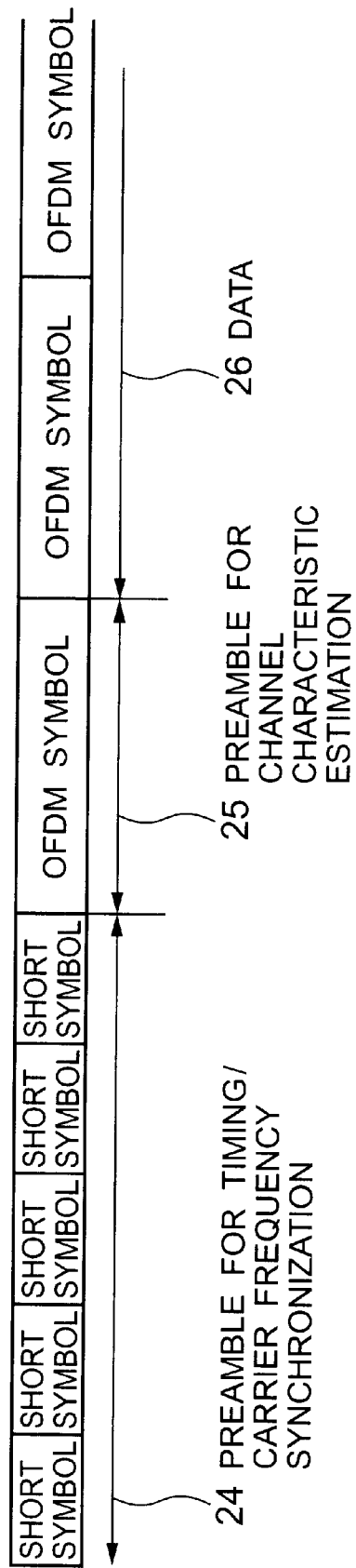
FIG. 6 shows a format of conventional OFDM burst data using short symbols.

FIG. 1 is a block diagram of an OFDM demodulator of the invention. In the format of an OFDM burst signal supplied, as shown in FIG. 6, a preamble 24 for timing/carrier frequency synchronization compliant with IEEE802.11 consists of symbols.

In FIG. 1, an OFDM burst signal is received by an antenna 1. An orthogonal component detector 2 converts the received signal into an analog complex baseband signal on the basis of a local signal which is close to a carrier wave.

A/D converters 3 and 4 sample and quantize the analog complex baseband signal outputted from the orthogonal component detector 2. A synchronization circuit 5 receives sampled and quantized digital complex baseband signals outputted from the A/D converters 3 and 4 and performs a synchronizing operation.

A fast Fourier transform (FFT) circuit 6 performs Fourier transform on output signals of the synchronization circuit 5 and divides an OFDM modulation signal into signals of respective subcarriers.

Upon receipt of the preamble 25 for channel characteristic estimation, a channel distortion estimating circuit 7 receives the signals of respective subcarriers from the FFT circuit 6 and estimates a channel characteristic $H(\omega)$. From the estimation result, the channel distortion estimating circuit 7 outputs a coefficient $1/H(\omega)$ for compensating channel distortion to a channel distortion compensating circuit 8.

The channel distortion compensating circuit 8 receives the signals of respective subcarriers and executes complex multiplication on the signals by the coefficient $1/H(\omega)$ for compensating channel distortion, thereby compensating the channel distortion. A subcarrier demodulating circuit 9 receives the signal which has been subjected to the distortion compensation, and performs demodulation each subcarrier.

Figure 2:
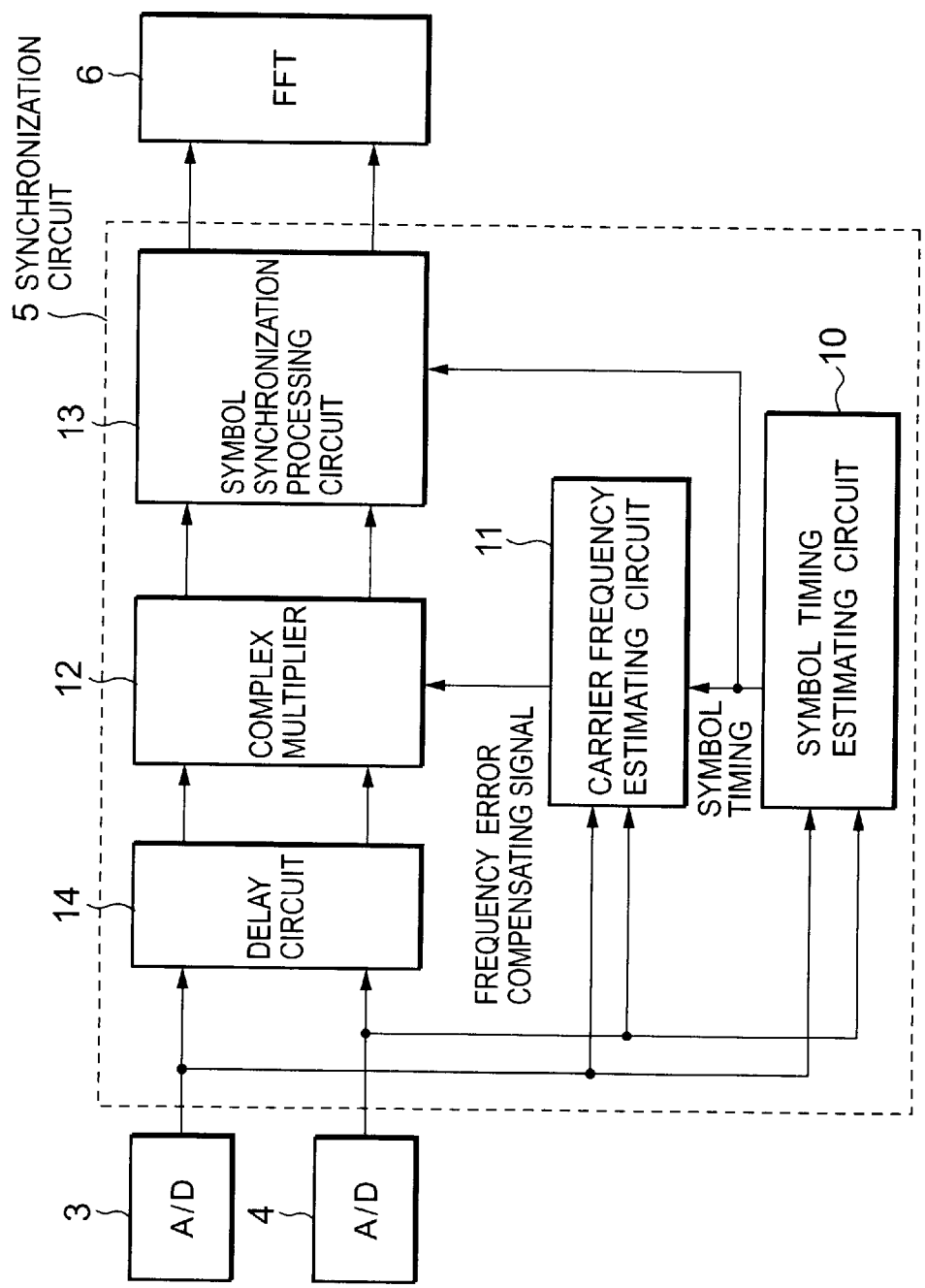
FIG. 2 shows a format of OFDM burst data of the invention.

FIG. 2 shows the configuration of the synchronization circuit 5. In FIG. 2, when the preamble 24 for timing/carrier frequency synchronization is received, a symbol timing estimating circuit 10 reproduces a symbol timing by the sampled and quantized digital complex baseband signals outputted from the A/D converters 3 and 4 and outputs a timing signal to a symbol synchronization processing circuit 13.

A carrier frequency estimating circuit 11 estimates the carrier frequency by using outputs of the A/D converters 3 and 4 upon receipt of the preamble for synchronization and outputs a frequency error compensating signal to a complex multiplier 12.

Figure 3:
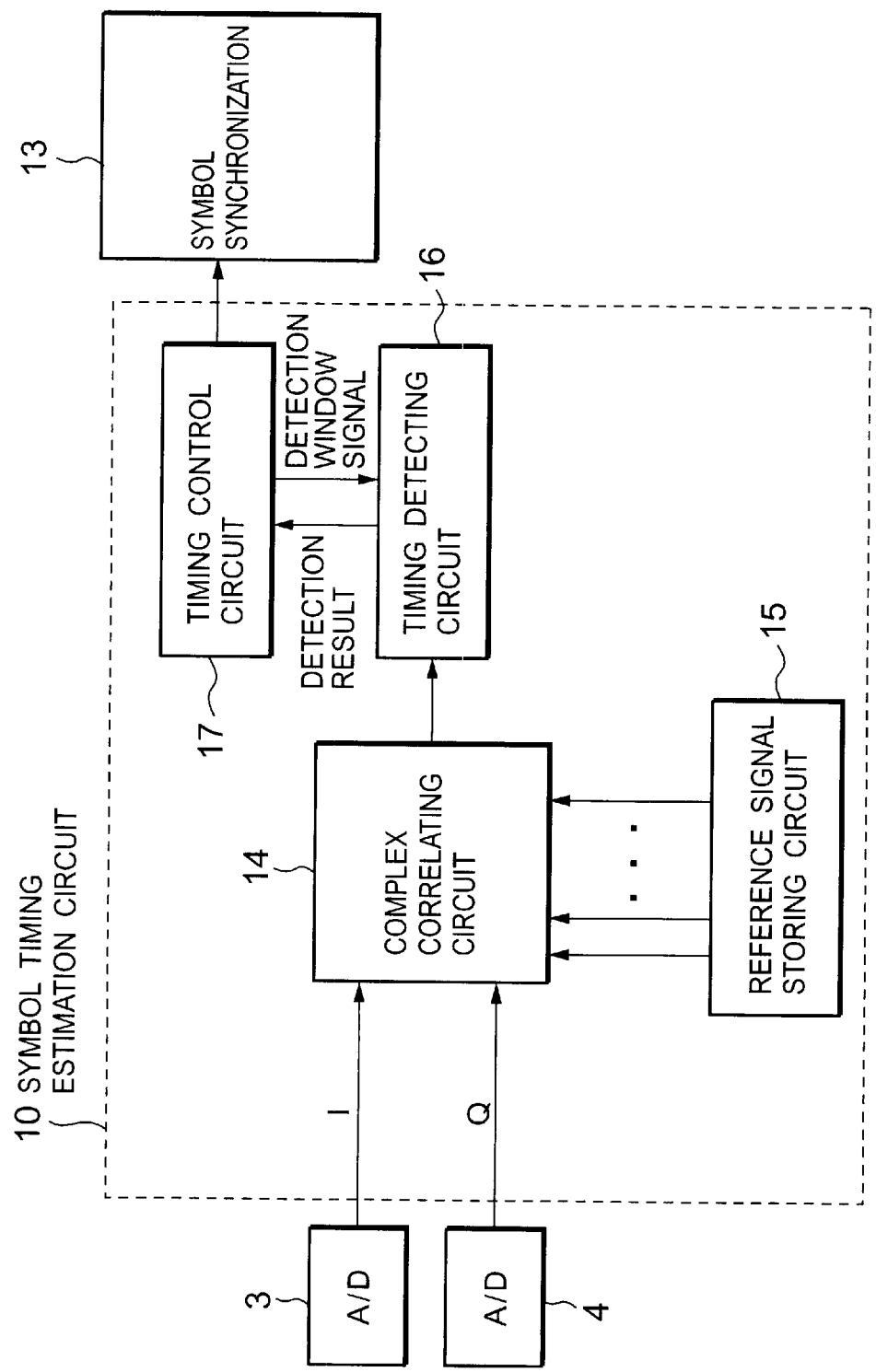
FIG. 3 is a block diagram showing the configuration of a synchronization circuit 5 in FIG. 1.

FIG. 3 shows the configuration of the symbol timing estimation circuit 10. In FIG. 3, a complex correlating circuit 14 correlates the sampled and quantized digital complex baseband signals outputted from the A/D converters 3 and 4 and the pattern of the preamble 24 for timing/carrier frequency synchronization of a short symbol prestored in a reference signal storing circuit 15 and sequentially outputs the result of correlation.

A timing detecting circuit 16 monitors the correlation result from the complex correlating circuit 14 and outputs the timing detection result.

A timing control circuit 17 receives the timing detection result from the timing detecting circuit 16, outputs a detection window signal to the timing detecting circuit 16, and outputs a timing signal to the symbol synchronization processing circuit 13.

The timing detecting circuit 16 detects the timing of the short symbols as the preamble 24 by using the correlation result from the complex correlating circuit 14.

Figure 4:
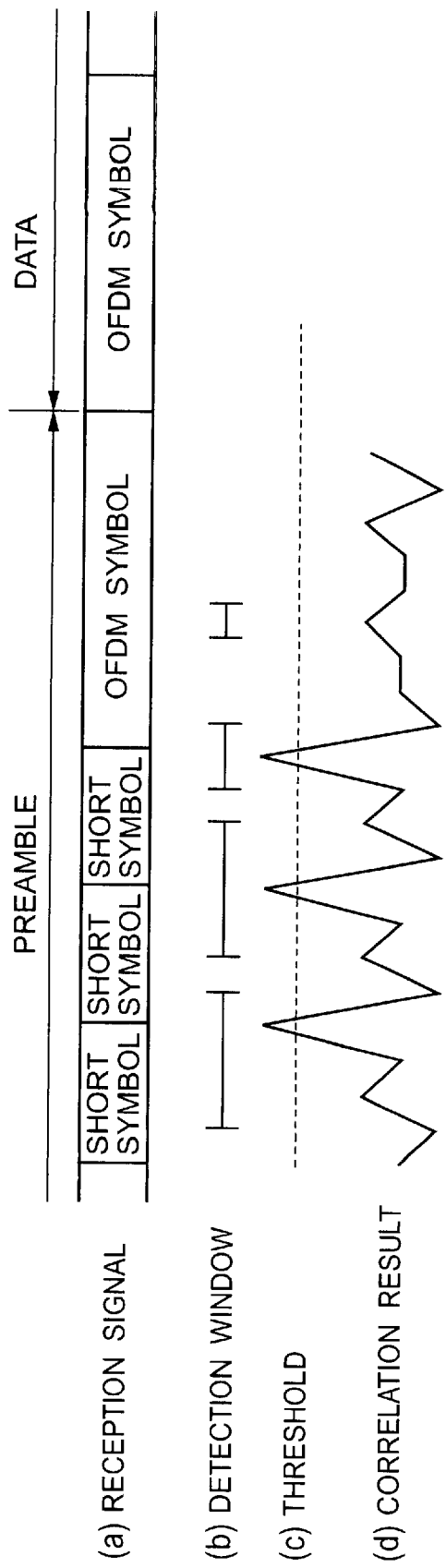
FIG. 4 is a block diagram showing the configuration of a timing reproduction circuit 10 in FIG. 1.

The timing detecting method will be described with reference to FIG. 4. As shown in FIG. 4, the correlation results correspond to the repeated short symbols. When a threshold is set and the correlation result exceeds the threshold, the peak is detected as the timing of the short symbol.

When the timing of the short symbol is detected, the timing control circuit 17 generates a detection window signal and narrows the period during which the peak detection is performed (time of detection window) step by step, thereby reducing the peak erroneous detection probability.

When the correlation result does not exceed the set threshold in a state where the width of the detection window is narrowed, it is detected as a timing at which the short symbol is switched to a signal of an OFDM symbol unit.

Figure 5:
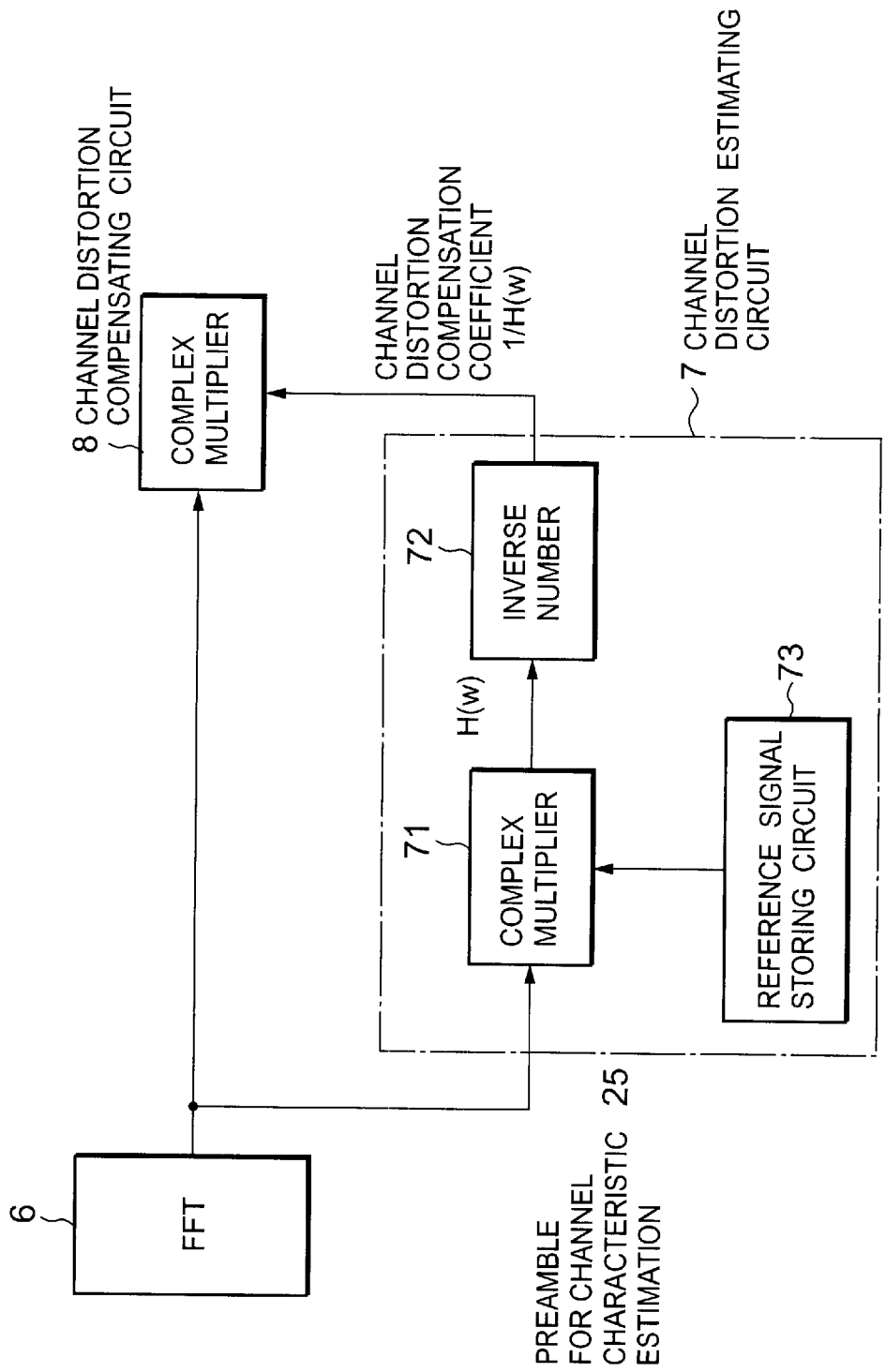
FIG. 5 is a block diagram showing the configuration of a propagation path distortion estimating circuit 7 in FIG. 1.

FIG. 5 is a block diagram of the channel distortion estimating circuit 7. In the diagram, the preamble signal 25 for channel characteristic estimation is supplied to a complex multiplier 71 in the channel distortion estimating circuit 7. The inverse number of the pattern of the preamble signal 25 is stored in a reference signal storing circuit 73 and is supplied to the other input of the complex multiplier 71 in the channel distortion estimating circuit 7. The input signals are multiplied by each other and an estimation result $H(\omega)$ of the channel characteristic is obtained as an output of the complex multiplier 71. The output $H(\omega)$ of the complex multiplier 71 is supplied to an inverse number circuit 72 where a coefficient $1/H(\omega)$ for compensating channel distortion is calculated. The channel distortion compensation coefficient $1/H(\omega)$ is multiplied by an output of the FFT 6 by the complex multiplier 8, thereby compensating the channel distortion. The resultant signal is outputted to the subcarrier demodulating circuit 9.

In the embodiment shown in FIG. 1, as the configuration of a quasi-synchronous detection circuit, a reception signal is first subjected to orthogonal component detection and a resultant is A/D converted. Obviously, on the contrary, it is also possible to perform the A/D conversion and then digitally perform orthogonal component detection.

As described in detail above, according to the invention, by using the preamble 24 for timing/carrier frequency synchronization consisting of short symbols shown in FIG. 6, the circuit scale of a correlation circuit or the like can be reduced and the process delay is also reduced as compared with the case of using the preamble consisting of OFDM symbols.

According to the invention, at the time of performing the timing reproduction, the width of the timing detection operation time is regulated by using the detection window signal, thereby enabling the timing detection accuracy to be raised also in the case of using the short symbols. Further, the timing at which the short symbols are switched to the OFDM symbols can be easily detected without enlarging the circuit scale.

According to the invention, the OFDM demodulator using the timing reproduction circuit which has a small process delay and operates stably with a small circuit scale can be provided.

While this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is, therefore, contemplated that the appended claims will cover any such modifications or embodiments as fall within the true scope of the invention.

What is claimed is:

1. An OFDM demodulator for demodulating an orthogonal frequency division multiplexing (OFDM) modulated burst signal, comprising:

a quasi-synchronous detector for converting the OFDM modulated bust signal into two complex baseband signals by quasi-synchronous detection;

a carrier frequency estimating circuit for receiving the complex baseband signals, estimating a carrier frequency, and compensating a carrier frequency error;

a symbol timing estimating circuit for controlling the width of a detection window on the basis of a result of correlation between a preamble signal in the complex baseband signal and a prestored pattern signal and reproducing a timing of the burst signal;

a symbol synchronization processing circuit for establishing symbol synchronization on the basis of an output of the symbol timing estimating means with respect to the complex baseband signal in which the carrier frequency error has been compensated;

an FFT for performing Fourier transform on an output of the symbol synchronization processing circuit to thereby divide the output into signals of respective subcarriers; and a subcarrier demodulator for demodulating an output of the FFT every subcarrier.

2. An OFDM demodulator according to claim 1, wherein the symbol timing estimating circuit detects a peak of an output whose correlation result exceeds a predetermined threshold to detect the timing of a short symbol in the preamble signal, when the short symbol is detected, narrows a detection window step by step, and detects a timing at which the correlation result does not exceed the predetermined threshold.

* * * * *

UNITED STATES PATENT AND TRADEMARK OFFICE
CERTIFICATE OF CORRECTION

PATENT NO. : 6,646,980 B1
DATED : November 11, 2003
INVENTOR(S) : Takeshi Yamamoto, Kazuhiro Okanoue and Tomoki Osawa It is certified that error appears in the above-identified patent and that said Letters Patent is hereby corrected as shown below:

Column 1,
Line 9, delete "being"

Column 2,
Line 9, delete "bust" insert -- burst --
Line 40, delete "2" insert -- 4 --
Line 42, delete "3" insert -- 2 --
Line 44, delete "4" insert -- 3 --
Line 45, delete "1" insert -- 3 --

Column 4,
Line 66, delete "bust" insert -- burst --

Column 5,
Line 11, delete "means" insert -- circuit --

Signed and Sealed this

First Day of June, 2004

JON W. DUDAS
*Acting Director of the United States Patent and Trademark Office*